US010554399B2

(12) United States Patent
Feliciano

(10) Patent No.: US 10,554,399 B2
(45) Date of Patent: *Feb. 4, 2020

(54) METHOD AND APPARATUS FOR ENCRYPTING AND DECRYPTING DATA

(71) Applicant: Audacious Designs, LLC, Astoria, NY (US)

(72) Inventor: Raymond Richard Feliciano, Brooklyn, NY (US)

(73) Assignee: Audacious Designs, LLC, Astoria, NY (US)

(*) Notice: Subject to any disclaimer, the term of this patent is extended or adjusted under 35 U.S.C. 154(b) by 208 days.

This patent is subject to a terminal disclaimer.

(21) Appl. No.: 15/593,716

(22) Filed: May 12, 2017

(65) Prior Publication Data

US 2017/0244554 A1    Aug. 24, 2017

Related U.S. Application Data

(63) Continuation-in-part of application No. 15/205,658, filed on Jul. 8, 2016, now abandoned, which is a continuation of application No. 14/138,653, filed on Dec. 23, 2013, now Pat. No. 9,397,830.

(60) Provisional application No. 61/747,336, filed on Dec. 30, 2012.

(51) Int. Cl.
*H04L 9/08* (2006.01)
*H04L 9/14* (2006.01)

(52) U.S. Cl.
CPC .............. *H04L 9/0869* (2013.01); *H04L 9/14* (2013.01); *G06F 2221/2111* (2013.01)

(58) Field of Classification Search
CPC ..... H04L 6/0869; H04L 9/0863; H04L 9/0872; H04L 9/0869
USPC .......................................................... 380/44
See application file for complete search history.

(56) References Cited

U.S. PATENT DOCUMENTS

| | | | |
|---|---|---|---|
| 5,584,023 A * | 12/1996 | Hsu .................. | G06F 21/6218 |
| 6,269,164 B1 | 7/2001 | Pires | |
| 7,050,580 B1 | 5/2006 | Herrero | |
| 8,265,273 B2 | 9/2012 | Yokota et al. | |
| 8,565,435 B2 | 10/2013 | Gentry et al. | |
| 9,397,830 B2 | 7/2016 | Feliciano | |
| 2001/0036275 A1 | 11/2001 | Murakami et al. | |
| 2003/0039357 A1 * | 2/2003 | Alten .................. | G06F 7/582 |
| | | | 380/46 |

(Continued)

*Primary Examiner* — Teshome Hailu
(74) *Attorney, Agent, or Firm* — Heslin Rothenberg Farley & Mesiti P.C.

(57) ABSTRACT

A method, system, and computer program product encrypt data. A processor(s) obtains plaintext (plaintext data) and randomly generates multiple seed keys and obtains a user-defined password. The processor(s) randomly generates encryption parameters (pattern indicators, end pointers, pattern indicator pointers, and component sizes) and encrypts the plaintext by converting the plaintext data to shuffle-transform encrypted text and generating, from the shuffle-transform encrypted text and based on the encryption parameters, a plurality of encrypted blocks. The processor(s) implements a dynamic mathematical offset, to a portion of mathematical functions underlying the encryption parameters. The processor(s) generates an encrypted chunk for each encrypted block of the plurality of encrypted blocks, wherein the encrypted chunk for each encrypted block contains a portion of the shuffle-transform encrypted text.

20 Claims, 13 Drawing Sheets

(56) References Cited

U.S. PATENT DOCUMENTS

| | | | |
|---|---|---|---|
| 2003/0152230 A1* | 8/2003 | Eaker | H04L 9/0656 380/255 |
| 2005/0135607 A1 | 6/2005 | Lee et al. | |
| 2007/0140488 A1* | 6/2007 | Dharmaji | H04N 7/165 380/212 |
| 2007/0240224 A1* | 10/2007 | Agrawal | G06F 16/24532 726/25 |
| 2008/0292097 A1 | 11/2008 | Lin | |
| 2010/0153723 A1* | 6/2010 | Artus | H04L 9/0656 713/168 |
| 2011/0087885 A1* | 4/2011 | Lerner | H04L 63/065 713/168 |
| 2011/0202764 A1* | 8/2011 | Furukawa | G06F 21/6254 713/167 |
| 2014/0248929 A1* | 9/2014 | Noonan | H04L 9/001 463/9 |
| 2017/0230175 A1 | 8/2017 | Feliciano | |

* cited by examiner

METHOD AND APPARATUS FOR ENCRYPTING AND DECRYPTING DATA

CROSS-REFERENCE TO RELATED APPLICATIONS

This application claims the benefit of U.S. Non-provisional patent application Ser. No. 15/205,658, filed Jul. 8, 2016, which claims the benefit of U.S. Non-provisional patent application Ser. No. 14/138,653, filed on Dec. 23, 2013, which claims the benefit of U.S. provisional application No. 61/747,336, filed on Dec. 30, 2012, which are incorporated herein by reference, in their entirety, for all purposes.

FIELD OF THE INVENTION

The present invention relates generally to the field of data encryption and more specifically to the use of randomly generated keys, randomly selected encryption patterns, and, optionally, additional metadata.

BACKGROUND

In a wide variety of applications, there is the need to securely encrypt information that must remain secret. Widely used encryption algorithms such as data encryption standard (DES) and advanced encryption standard (AES) share the weakness of consistently encrypting equivalent messages the same way, over and over again. That approach exposes a potential exploitable breach of security for sensitive information, whereas an identifier, such as a Social Security Number, appear identically encrypted by prior art methods each time it occurs, creating an identifiable encrypted pattern, and is vulnerable to brute-force attacks. In accordance with Moore's Law, average computing power doubles every 18 months; and with stronger and faster computers, items vulnerable to brute-force attacks become even more vulnerable over time. Opportunities exist, therefore, to improve the security of encryption algorithms.

SUMMARY

Embodiments of the present invention utilize pointers to indicate the locations and sizes of encryption components, utilizing randomly determined patterns to be used for a random number of characters of text data being encrypted. For each randomly determined block of text, a randomly determined pattern is selected, which specifies how to combine the encryption components, including the shuffled and encrypted text, and references to that block's seed key, the size and composition of which are randomly determined. In certain embodiments of the present invention, for each block of text, the mathematical offset to every pointer and indicator dynamically changes a predefined number of times (e.g., three times), dependent upon any password utilized. In some embodiments of the present invention, the program code implements a dynamic mathematical offset, to a portion of mathematical functions underlying the encryption parameters. Additionally, by including a package of metadata in the encryption and decryption process, additional functionality may be added, including requiring that user defined conditions must be met to enable decryption. In some embodiments of the present invention, program code executing on one or more processing resource obfuscates the plaintext letters "E" and "e" from being identified by performing a frequency analysis by being replaced by a set of infrequently used characters, such as "KJXQZ" and "kjxqz" respectively. In an aspect of certain embodiment of the present invention, the characters that would impede programming or hypertext rendering, including < >'&Λ", may be excluded from the encrypted text, making the solution compatible with HTML, XML, JSON, and other text based programming.

In embodiments of the present invention, there is provided a methodology and system for encrypting and decrypting data, with decryption contingent upon user defined conditions being met. The encryption process comprises a method for using pointers to indicate the locations and sizes of encryption components, utilizing randomly determined patterns to be used for a random number of characters of text data being encrypted. For each randomly determined block of text, a randomly determined pattern is selected, which specifies how to combine the encryption components, including the shuffled and encrypted text, and references to that block's seed key, the size and composition of which are randomly determined.

In embodiments, the decryption of data comprises methods for reversing the process to decode encrypted text, iteratively extracting the decryption components in accordance with the pattern indicator identified for each block of encrypted text, as determined by the end block and back pointers. To enable output, a checksum of the decrypted message is matched against the checksum within the encrypted message to verify message integrity. Additionally, by including a package of metadata in the encryption and decryption process, additional functionality may be added which includes requiring user-defined conditions that must be met to enable decryption. This metadata can include any combination of constraints, including, but not limited to, a shared secret password, timestamp dependencies, location dependencies, entity or device authorization, or other user-defined parameters.

In a first aspect, embodiments of the present invention provide a computer-implemented method of encrypting data, comprising: obtaining plaintext; generating multiple random seed keys; obtaining a user-defined password; generating a plurality of encrypted blocks, wherein each of the plurality of encrypted blocks includes a randomly generated key, a randomly generated pattern indicator, a pattern indicator pointer, and an end pointer; and generating an encrypted chunk for each encrypted block of the plurality of encrypted blocks, wherein the encrypted chunk contains a portion of plaintext data that is converted to shuffle-transform encrypted text.

In a second aspect, embodiments of the present invention provide a computer program product embodied in a computer readable medium for implementation of a computer-implemented method of encrypting data comprising: code for obtaining plaintext; code for thwarting frequency analysis, code for optionally removing characters that could conflict with programming from the result set array; code for generating multiple random seed keys; code for obtaining a user-defined password; code for generating a plurality of encrypted blocks utilizing the password, code for dynamically changing the mathematical offset to pointers one or more times (e.g., three, seven, nine, etc.) per block, wherein each of the plurality of encrypted blocks includes a randomly generated key, a randomly generated pattern indicator, a pattern indicator pointer, an end pointer; and code for generating an encrypted chunk for each encrypted block of the plurality of encrypted blocks, wherein the encrypted chunk contains a portion of plaintext data that is converted to shuffle-transform encrypted text.

In a third aspect, embodiments of the present invention provide a computer system for implementation of a data encryption apparatus comprising: a memory which stores instructions; one or more processors coupled to the memory wherein the one or more processors are configured to: obtain plaintext; generate multiple random seed keys; obtain a user-defined password; generate a plurality of encrypted blocks utilizing the password, wherein each of the plurality of encrypted blocks includes a randomly generated key, a randomly generated pattern indicator, a pattern indicator pointer, an end pointer; and generate an encrypted chunk for each encrypted block of the plurality of encrypted blocks, wherein the encrypted chunk contains a portion of plaintext data that is converted to shuffle-transform encrypted text.

DETAILED DESCRIPTION

Figure 1:
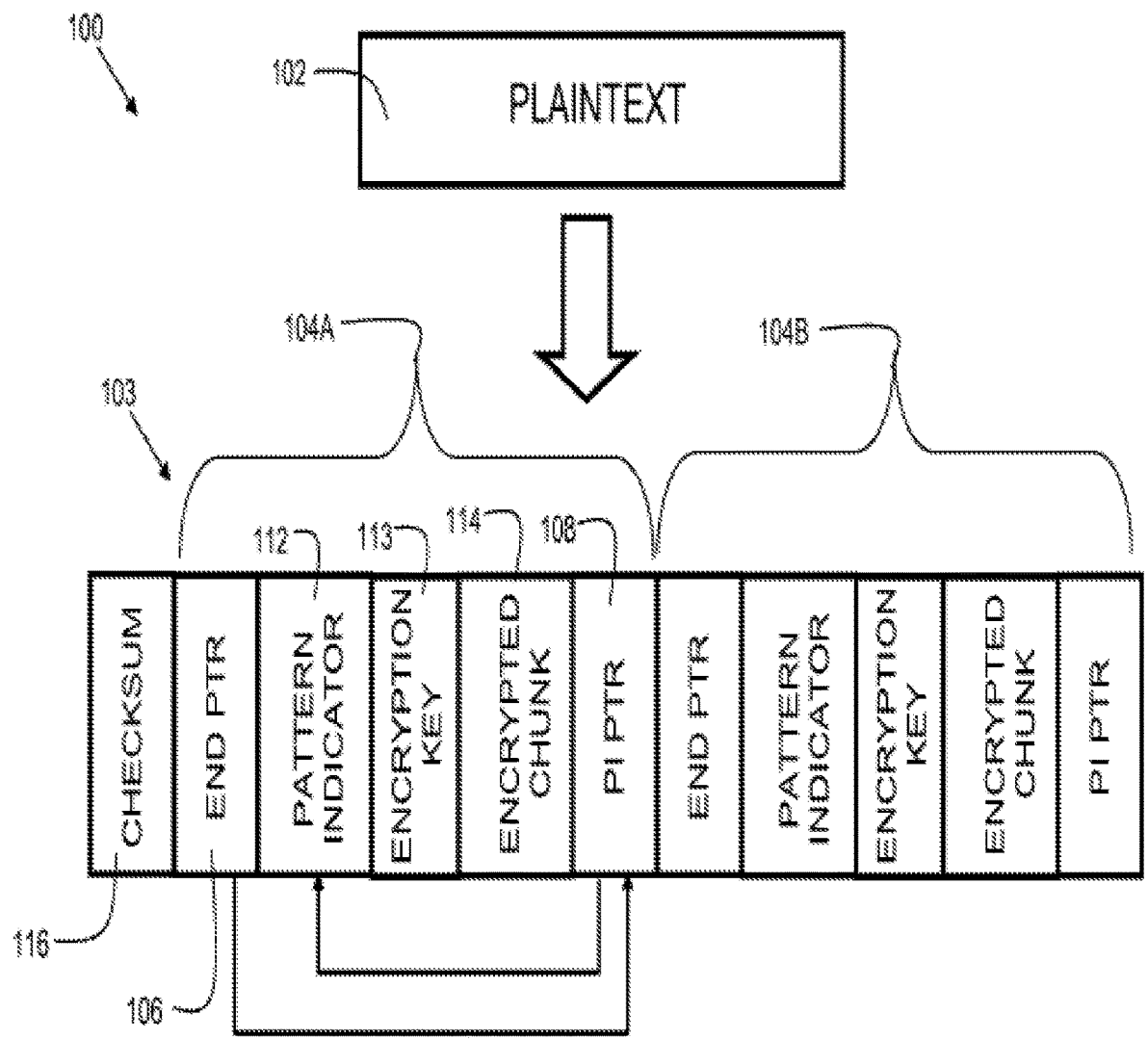
FIG. 1 shows a block diagram of a data structure in accordance with embodiments of the present invention.

FIG. 1 shows a block diagram 100 of a data structure in accordance with embodiments of the present invention. Using a computer-implemented method, a plaintext 102 is converted into an encrypted data structure 103. Encrypted data structure 103 comprises a plurality of encrypted blocks, indicated as 104A and 104B. Each encrypted block comprises an end pointer 106. The end pointer 106 points to a forward location within the data structure, which is the location of a pattern indicator pointer 108. The pattern indicator pointer 108 points to a backward location within the data structure, which is the location of a pattern indicator 112. In embodiments, the pattern indicator may be randomly generated, and may include an integer based on a randomly generated key, referred to as a random seed key. The random seed key is different each time a random seed key is retrieved from the computer system used for encryption (e.g. via the operating system or other suitable source). The pattern indicator 112 may represent a selection of one of many encryption patterns. The pattern indicator 112 specifies the encryption pattern to be used for a particular block of encrypted text. The pattern indicated by pattern indicator 112 may include, but is not limited to, a randomly determined key 113, a key cluster size, a forward or backward indicator to a key cluster, and other transformational pattern data. Since the pattern indicator 112 is based on randomness, the layout of components changes with each block. Since the encryption key is based on randomness, the size and composition of encryption key 113 changes with each block. A randomly determined encryption key 113 is used for creating encrypted chunk 114, which represents a portion of encrypted information (a portion of the plaintext 102 that gets encrypted). In embodiments, the key 113 may include a symbol table reversal. In embodiments, the key 113 may represent a shuffle transform followed by a key cluster application (key cluster application illustrated in FIG. 8). The key 113 is randomly generated, and changes with each block. Therefore, the encrypted output is different in each instance of the encryption, even if the plaintext does not change. For example, encrypting the name "JOHN SMITH" will yield a different encrypted output each time. This helps thwart malicious activity based on pattern recognition. Random selection determines a substitution symbol array used for encrypting a portion of the plaintext 102. The substitution symbol array is then used to create encrypted chunk 114, which is an encrypted version of a portion of plaintext 102. The encrypted chunk size and pattern indicator preferably vary amongst the various encrypted blocks. Therefore, preferably encrypted block 104A has a different pattern indicator value from the pattern indicator for encrypted block 104B, and the size of encrypted chunk for encrypted block 104A is preferably different from the size of the encrypted chunk for encrypted block 104B. A checksum 116 of all the data included in the encrypted chunks is concatenated to the entire data structure. The checksum 116 is used during the decryption process to ensure no tampering of the encrypted data occurred.

Figure 2:
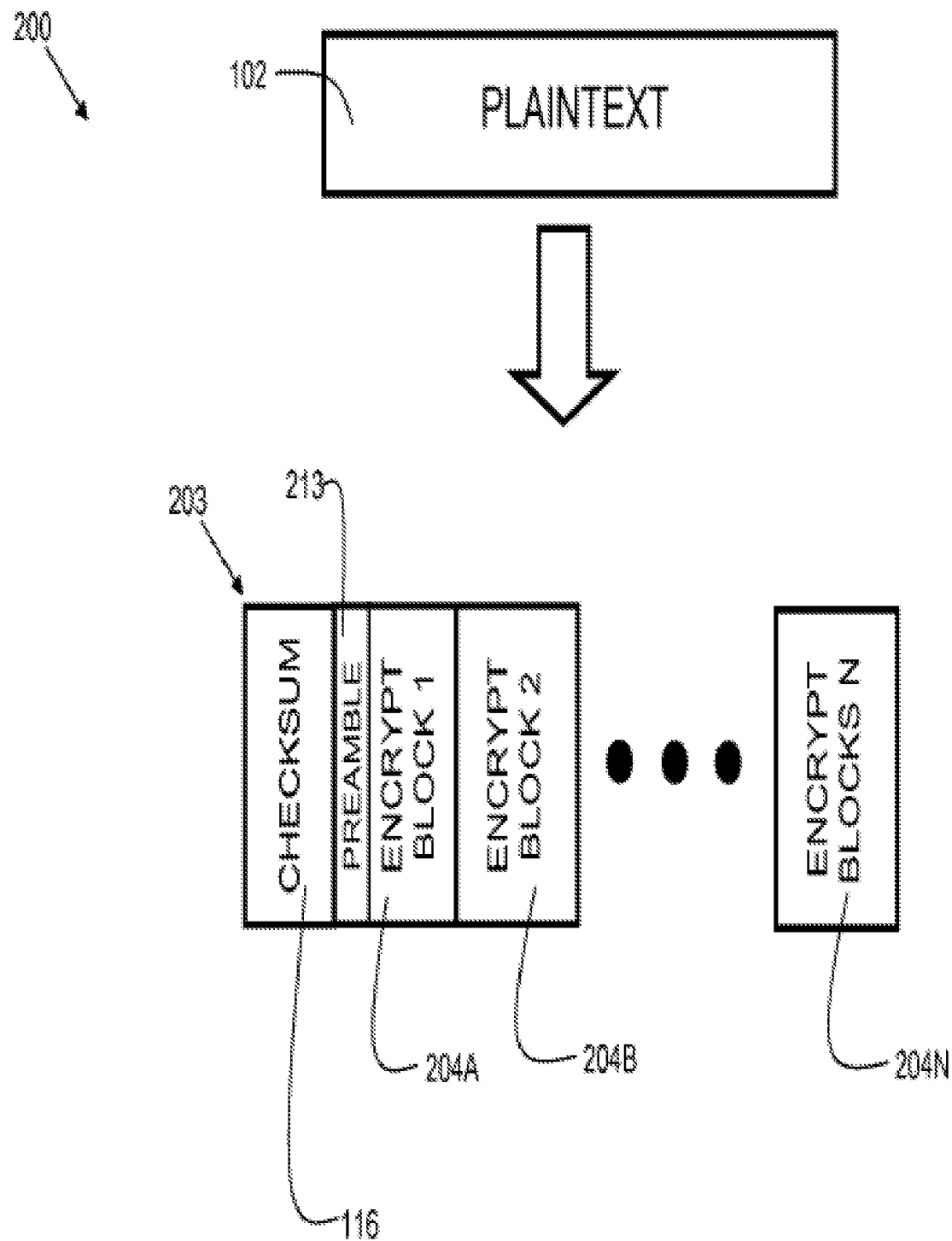
FIG. 2 shows a block diagram of an extended data structure in accordance with embodiments of the present invention.

FIG. 2 shows a block diagram 200 of an extended encrypted data structure 203 in accordance with embodiments of the present invention. While two encrypted blocks are shown in FIG. 1, in practice, many encrypted blocks may be used to encrypt plaintext 102. The data structure format includes the checksum 116, and a plurality of encrypted blocks, indicated as 204A, 204B, and 204N. In practice, there may be many encrypted blocks (e.g. thousands of encrypted blocks), and the pattern indicator, key, and encrypted chunk size may vary amongst the encrypted blocks.

In embodiments, optionally, a preamble 213 may be incorporated, which comprises encrypted metadata. The preamble 213 may have a predefined signature used to identify it. The preamble 213 may contain one or more conditional decrypt criteria. The conditional decrypt criteria may be inserted into the preamble, and the preamble may be prepended to the body of the encrypted message. The conditional decrypt criteria must be met in order to allow the data to be decrypted. Examples of conditional decrypt criteria include, but are not limited to, a time-before condition, a time-after condition, a GPS in radius condition, a GPS out-radius condition, and a GPS jurisdictional boundary condition. In addition, a GPS defined polygon may be defined, wherein decryption is allowed (or prohibited) within the confines of the GPS defined polygon. A time before condition only allows decryption if the date/time is before a certain date/time. In effect, a time-before condition defines an expiry of the encrypted data, after which time, it can no longer be decrypted. A time-after condition only allows decryption if the date/time is after a certain date/time. A GPS in-radius condition only allows decryption if the computational device is located within a certain radius from a geographical location. Conversely, a GPS out-radius condition only allows decryption if the computational device is located outside a certain radius from a geographical location. A GPS out-radius condition can be used to exclude decryption in certain locations (e.g. a competitor's headquarters). A GPS jurisdictional boundary condition only allows decryption within a given jurisdictional boundary (e.g. within the United States, or within New York). Embodiments that support a positional criterion utilize a computing platform that has location capabilities, such as a mobile phone with an integrated Global Positioning System (GPS). Some embodiments may utilize multiple conditional decrypt data. The multiple conditional decrypt data may include any user-defined criteria, including positional criterion and temporal criterion. Some embodiments may include multiple positional criteria and temporal criteria. For example, data may be encrypted having a time-before condition, a time-after condition, and a GPS in-radius condition. In this case, the data can only be decrypted at a time in between the time-after date/time and the time-before date/time, and within a predetermined radius of a geographical location. For example, a preamble formatted as:
<HEADER>TA 11/16/2013-4:00UTC; TB 11/18/2013-4:00UTC;GPSI 1.5 N42. 651732W73 .754418
indicates that the data is only to be decrypted between the dates of Nov. 16, 2013 and Nov. 18, 2013, and within a 1.5 mile radius of the geographical location represented by N42.651732 W73.754418. In embodiments, the preamble is encrypted with the substitution symbol array so that it cannot be easily discovered through reverse engineering or hacking attempts. The <HEADER> may contain a pre-defined data pattern to indicate the presence of the preamble, as well as other pertinent data for parsing, such as preamble size, and a number of conditional decryption criteria. However, with the preamble also encrypted, the header information is not recognizable to a hacker.

Figure 3:
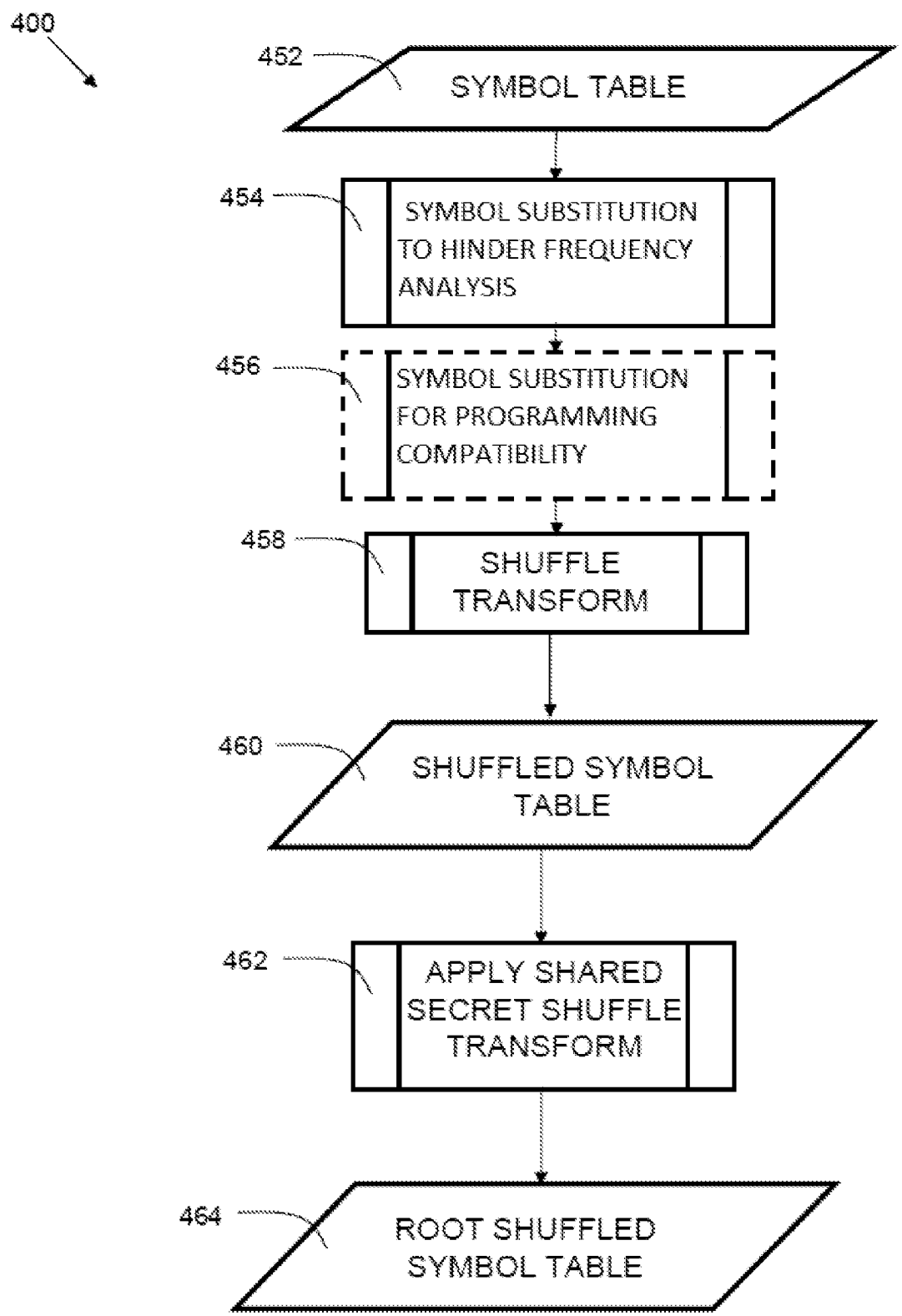
FIG. 3 is a flowchart showing process steps for generating a root shuffled symbol table in accordance with embodiments of the present invention.

FIG. 3 is a flowchart 400 showing process steps for generating a root shuffled symbol table in accordance with embodiments of the present invention. The root shuffle symbol table represents the substitution table base. Process step 452 indicates retrieving an ordered symbol table. In process step 454, symbol substitutions are applied to hinder frequency analysis. In process step 456, symbol substitution may optionally be applied to improve programming compatibility. In process step 458, a shuffle transform is performed on the ordered symbol table, and the resulting output is shuffled symbol table 460. In process step 462, a shared secret is applied to generate root shuffled symbol table 464. The shared secret may include a user-defined password. In embodiments, the shared secret of a user-defined password may be concatenated with an entity specific identifier, and/or other user-defined criteria, thereby forming an extended password. The extended password contains a user-defined portion and a hidden portion that is not exposed to a user.

Figure 4:
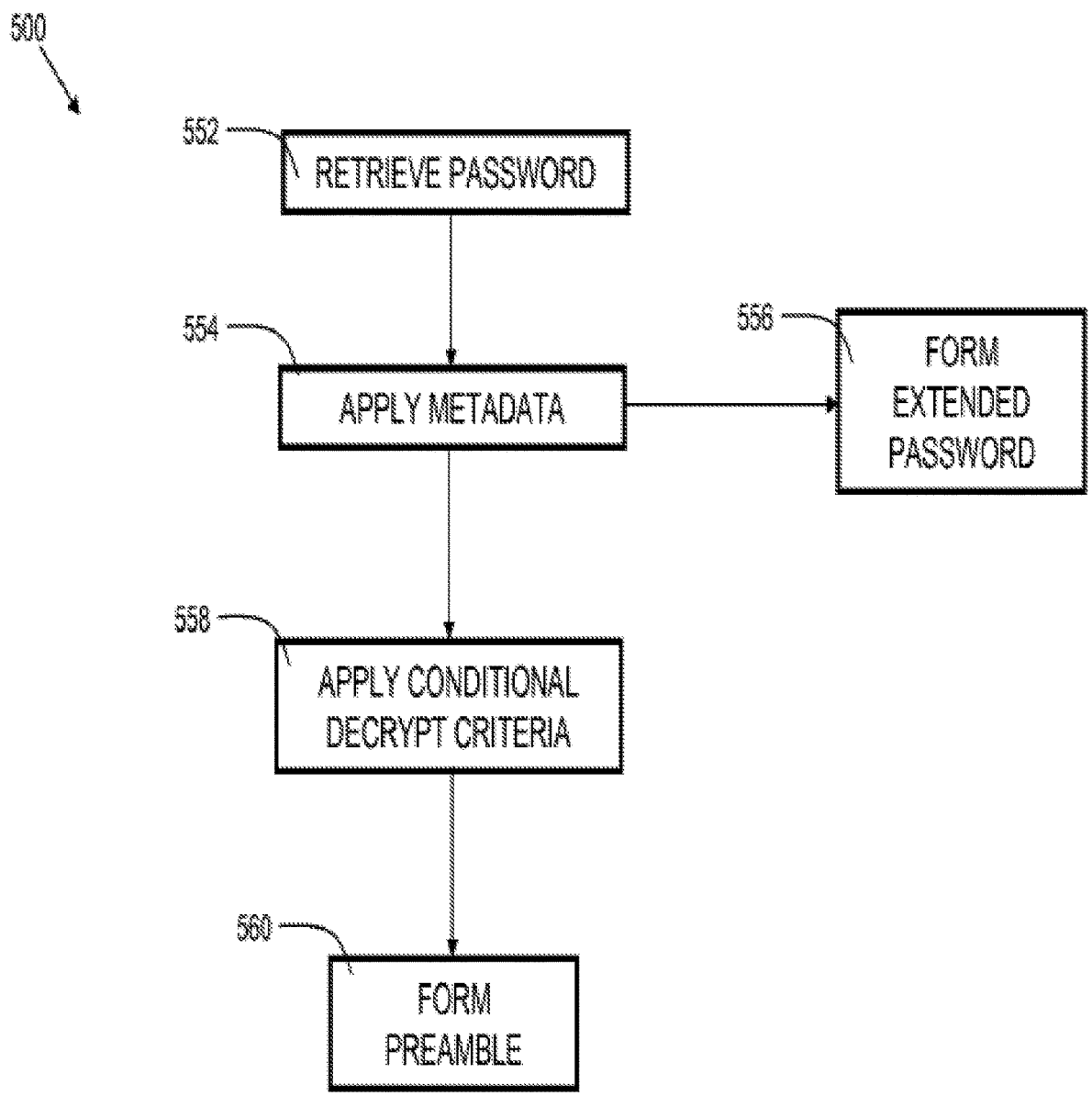
FIG. 4 is a flowchart showing process steps for generating shared secret data and conditional decrypt criteria in accordance with embodiments of the present invention.

FIG. 4 is a flowchart 500 showing process steps for generating an optional preamble, including conditional decrypt criteria in accordance with embodiments of the present invention. In process step 552 a password is retrieved. The encryption and decryption is symmetric, so the same password is used for encryption and decryption. In process step 554, optionally, metadata is applied to the password to form an extended password 556. The application of metadata may include appending a unique string to the password. In embodiments, the application of metadata includes retrieving an origination identifier and appending the origination identifier to the password. The origination identifier is an entity specific identifier, and may be a unique string assigned to a particular corporate entity. Computers belonging to the corporate entity are loaded with the origination identifier in an obscured location within the computer (such as in the registry or other obscure location). The origination identifier becomes part of the data used to encrypt the plaintext. Hence attempts to decrypt the encrypted data on a computer outside of the corporate entity fail because the origination identifier is not present. In this way, companies can encrypt data in such a way that it can only be decrypted on company-issued computing equipment. In process step 558, optionally, conditional decrypt criteria are encrypted using the root shuffled symbol table, forming preamble 560. The preamble may be located before the body of the encrypted message (see 213 of FIG. 2).

Figure 5:
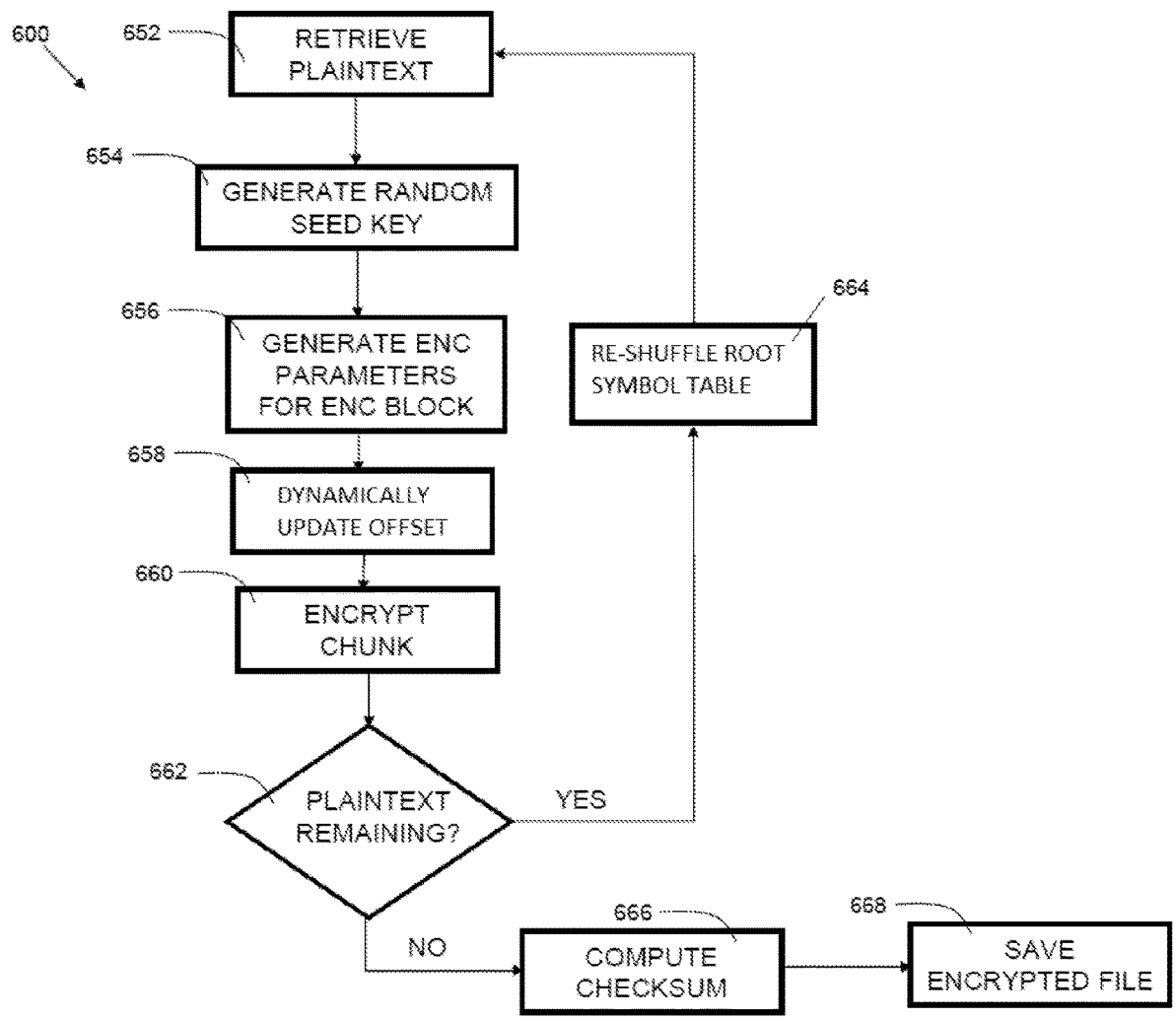
FIG. 5 is a flowchart showing process steps for data encryption in accordance with embodiments of the present invention.

FIG. 5 is a flowchart 600 showing process steps for data encryption in accordance with embodiments of the present invention. In process step 652, the plaintext to be encrypted is retrieved. In process step 654, a random seed key is generated (see 902 of FIG. 8). In process step 656, the encryption parameters for an encryption block are generated. These encryption parameters include the pattern indicator, and values for the end pointer and pattern indicator pointer for the encryption block. The encryption parameters may be taken from random values. In process step 658, the offset applied to pointers and indicators is dynamically updated based upon the password.

Figure 13:
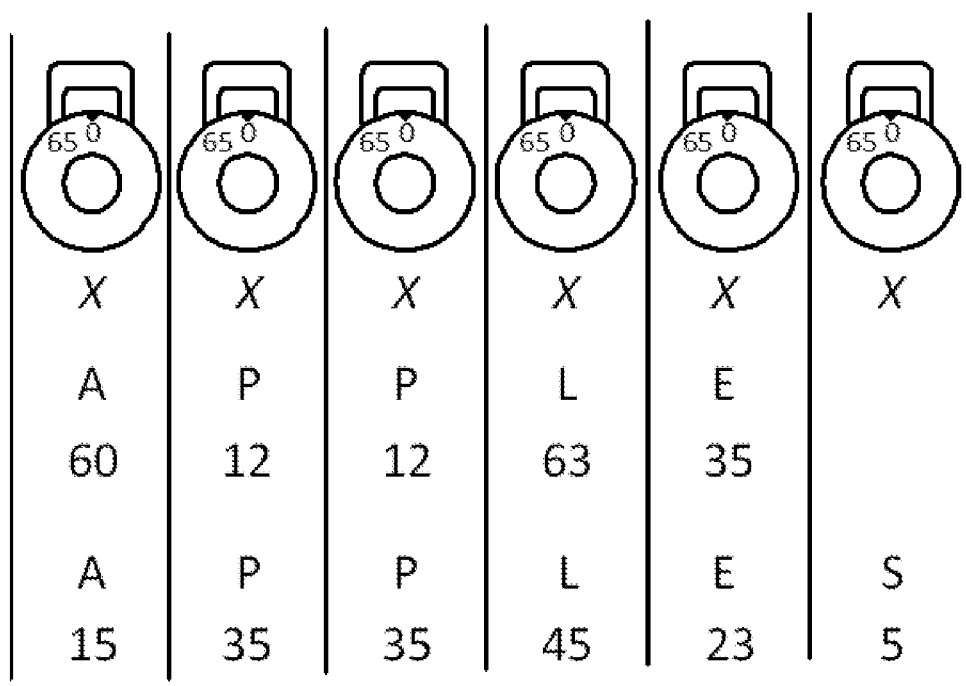
FIG. 13 illustrates certain aspects of some embodiments of the present invention.

FIG. 13 illustrates the dynamic offset aspect of some embodiments of the present invention. As aforementioned, the program code performs a dynamic mathematical offset, to a portion of mathematical functions underlying the encryption parameters, which varies depending on various factors, including but not limited to, the password. In an embodiments of the present invention, the program code utilizes each character of the password to generates a 0-65 value, with the entire set forming a password dependent numeric array. The program code then utilizes the value from one dynamically selected element of that array to determine the numeric offset to be applied to a portion of mathematical functions and pointers, for that particular point in the encryption processing. For example, if the password were "apple," the program code could generate at offset array of 60, 12, 12, 63, 35. If the password were "apples," the program code could generate an offset array of 15, 35, 35, 45, 23, 5. As seen in this example, a change in a single character in a password can affect the entirety of the array. FIG. 13 illustrates the contrast between the array generated by the one or more programs when the password is "apple" versus the array that may be generated by the one or more programs when the password is "apples."

In process step 660, an encrypted chunk is created from a portion of the plaintext retrieved in process step 652. The encrypted chunk is encrypted by using a substitution symbol table derived from the encryption parameters generated in process step 656. In process step 662, a check is made to see if any plaintext is remaining. If yes, process step 664 performs another shuffle transformation, as per FIG. 3, and then the process steps of 652, 654, 656, 658, 660, and 662 repeat, until the condition at 660 is no, at which point the process proceeds to computing a checksum on the encrypted data in process step 666. Optionally, the file is saved in process step 668. However, some embodiments may not save the file. In some embodiments, the data may be transmitted to another entity (e.g. another computer via a communications network) without saving a permanent copy of the encrypted file. In some embodiments, the data is saved, and also transmitted to another entity.

Figure 6:
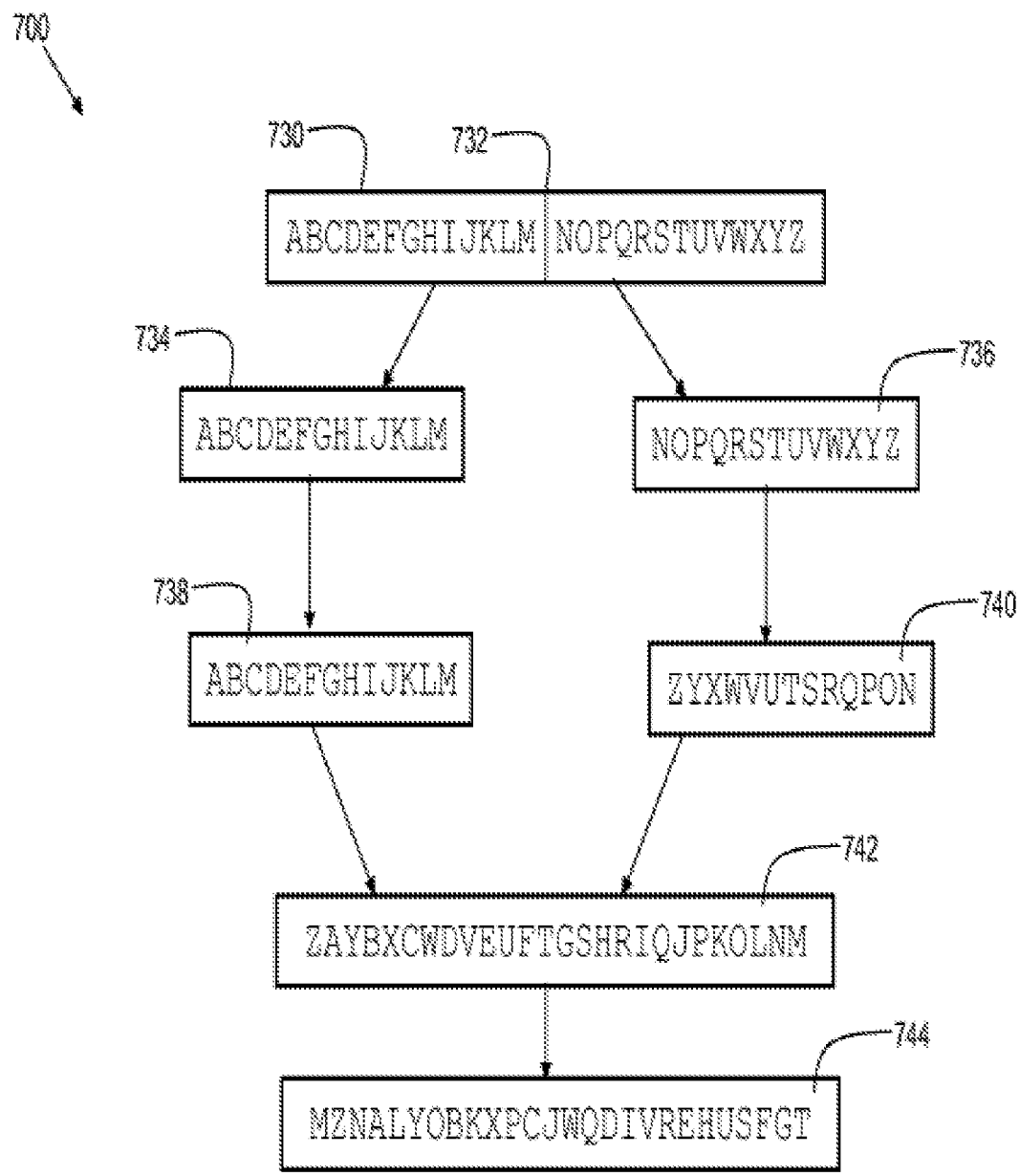
FIG. 6 is an exemplary data flow for performing a shuffle transform in accordance with embodiments of the present invention.

FIG. 6 is an exemplary data flow 700 for performing a shuffle transform in accordance with embodiments of the present invention. Block 730 shows an ordered symbol table. Note that while the ordered symbol table in block 730 is a capitalized roman alphabet, embodiments of the present invention may utilize many more symbols, including the ASCII, extended ASCII, and/or Unicode symbols. The default shuffle transform utilizes a split point 732 located in the midpoint of the symbol table. Other split points are possible. The ordered symbol table is split into a first portion 734 and a second portion 736. In the next step, the first portion 734 remains the same, as indicated in block 738, and the second portion is reversed as shown in block 740. In the next step the first block and second block are interleaved, starting with the first character of the second block, resulting in shuffled array 742. Hence going from the ordered symbol table 730 to the shuffled symbol array 742 requires one shuffle transformation, denoted as ST(1). Performing a shuffle transform on array 742 (by repeating the aforementioned steps) results in shuffled block 744. Hence, shuffled block 744 requires two shuffle transforms, and is derived by ST(2), meaning shuffle the ordered symbol table twice. In general, a shuffled block can be derived by performing a transform of ST(x) on the ordered symbol table, where x is the number of times to shuffle. Hence, if the value of x is known, the appropriate number of transforms can be performed to derive a desired shuffled array.

Figure 7:
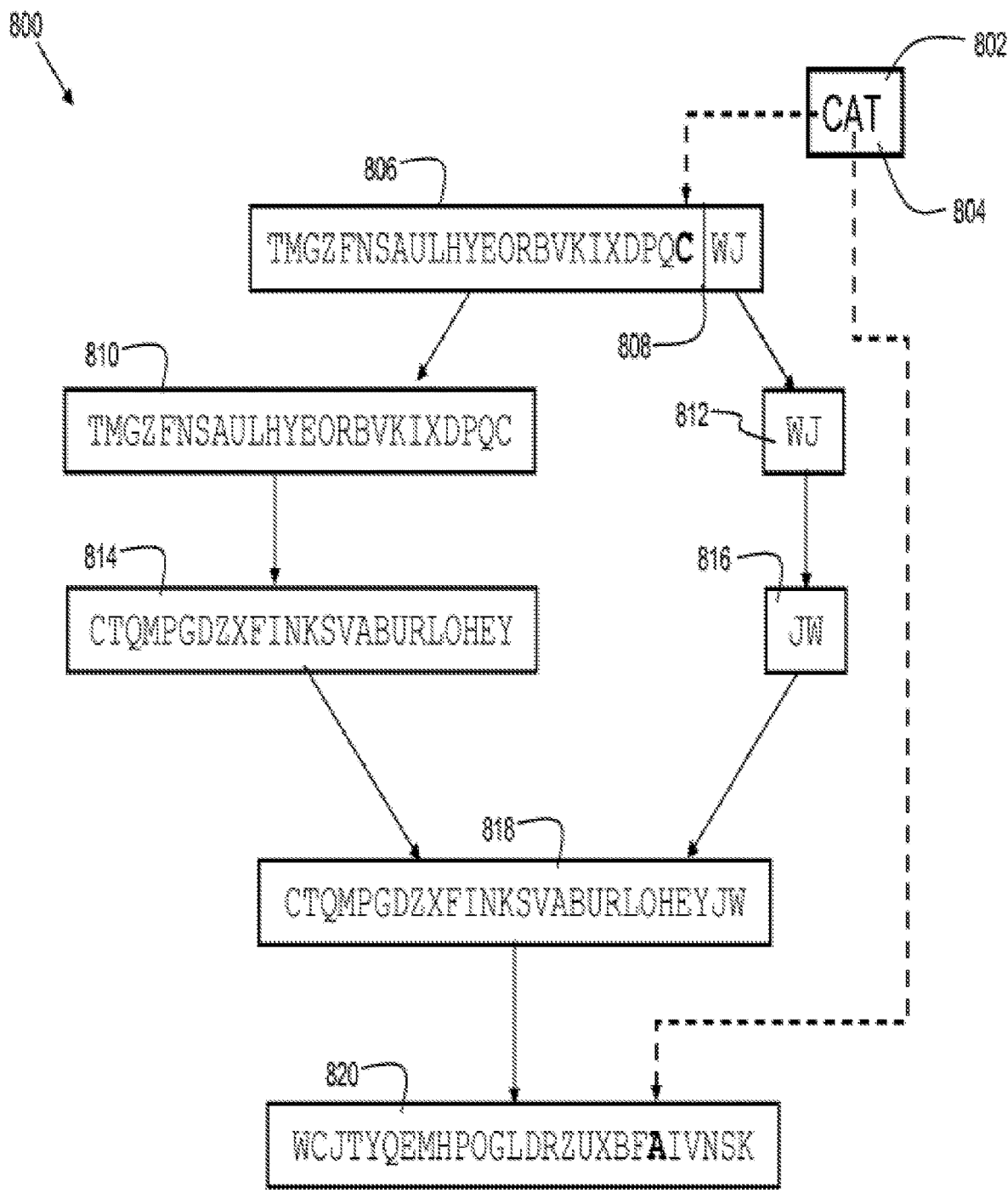
FIG. 7 is an exemplary data flow for application of a shared secret in accordance with embodiments of the present invention.

FIG. 7 is an exemplary data flow 800 for application of a password in accordance with embodiments of the present invention. To encrypt data, a user selects a password 802. In some embodiments minimum password length and password strength test(s) may be applied to ensure a sufficiently strong password. In this example, the password is "CAT." The password 804 is used to change a shuffled array to form the root shuffled symbol table. In this example, the process starts with shuffled array 806, which is derived by performing multiple shuffle transforms on an ordered symbol table. Then, each character in the password is used to manipulate the shuffled array 806 to form a new shuffled array. For each character in the password, the position of that character in the shuffled array 806 is identified, and a split point 808 is marked after that character. The shuffled array 806 is split into a first portion 810 and a second portion 812. The first portion 810 is shuffled to generate array 814. The second portion 812 is shuffled to generate array 816. Array 814 and array 816 are concatenated together to form new array 818, and that array is shuffled again to produce array 820. The aforementioned steps now repeat using the next character in the password ("A" in this example). The process continues until all the characters in the password are processed, and the resulting shuffled array is the root shuffled symbol table.

In the case of additional metadata the additional metadata may be concatenated to the password prior to performing the above mentioned steps, to form an extended password (see step 556 in FIG. 4). If an origination identifier is in use, the origination identifier is appended to the user-provided password. For example, if the origination identifier is NHYTG, and the user provides a password of CAT, then the extended password becomes CATNHYGT, and that string is used to generate the root shuffled symbol table. When the data is decrypted, the user provides the password of CAT. The origination identifier, which is present on the device performing the decryption, is again appended to the password by the decrypting computing device, to form the extended password CATNHYGT. If the origination identifier of the decrypting device is different or unavailable, then the decryption cannot take place.

Figure 8:
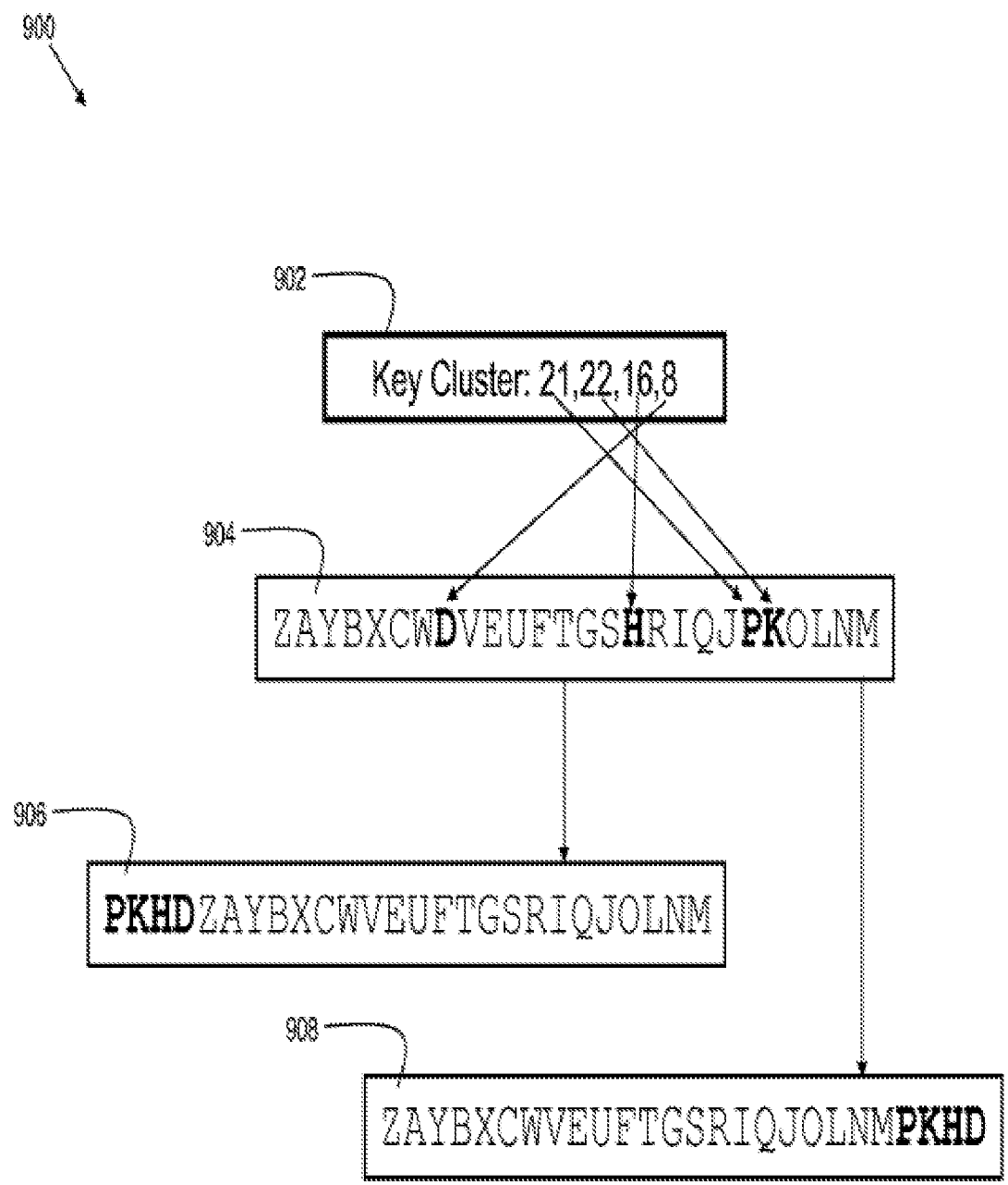
FIG. 8 is an exemplary data flow for application of a key cluster in accordance with embodiments of the present invention.

FIG. 8 is an exemplary data flow 900 for application of a key cluster in accordance with embodiments of the present invention. A key cluster provides a novel way to make many possible shuffled arrays without needing to perform additional shuffle transforms. Key cluster 902 comprises an array of numbers. The size of the array can vary. In the example shown, the size is four, and the numbers are 21, 22, 16, and 8. To perform a key cluster operation on shuffled array 904, the subset of characters identified by the position of the numbers in the key cluster are extracted (removed from their original positions) from the shuffled array 904, and may be concatenated to the front (beginning) of the original array to form shuffled array 906. This is a front key cluster. In alternative embodiments, a back key cluster is used, where the characters are concatenated to the back (end) of the original array to form shuffled array 908. The key cluster may be stored in the encrypted data structure as part of the pattern indicator 112 of FIG. 1.

Figure 9:
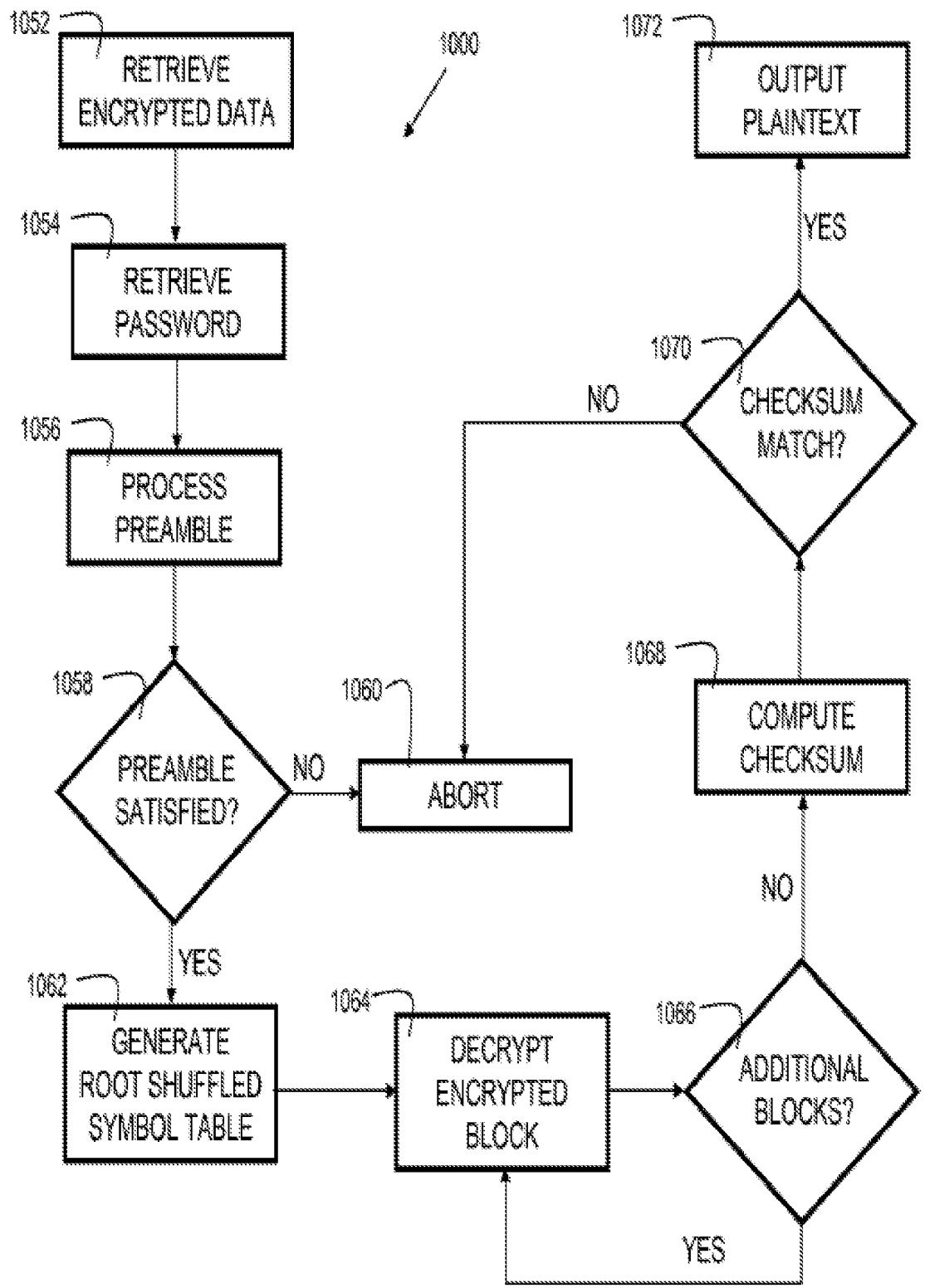
FIG. 9 is a flowchart showing process steps for data decryption in accordance with embodiments of the present invention.

FIG. 9 is a flowchart 1000 showing process steps for data decryption in accordance with embodiments of the present invention. In process step 1052, encrypted data is retrieved. In process step 1054, a shared secret password is retrieved. This may include receiving a password from a user. In process step 1056, a preamble, if present, is processed. The preamble may include one or more conditions that need to be true in order for the decryption process to proceed. These include, but are not limited to, temporal criteria, and positional criteria. Other environmental criteria may also be applied. Other decryption criteria are possible and within the scope of embodiments of the present invention. In process step 1058, a check is made to determine if the preamble conditions (decryption criteria) are satisfied. If the decryption criteria are not satisfied, the decryption process aborts in process step 1060. If the preamble is satisfied, a root shuffled symbol table (see 460 of FIG. 3) is generated in process step 1062 by appending the satisfied conditions of the preamble conditions to the password, to form an extended password (see 556 of FIG. 4). This is used as the root shuffled symbol table, the basis needed to decrypt an encrypted block in process step 1064. The decryption process of block 1064 includes finding the key, end pointer and pattern indicator pointer, and finding the pattern indicator from that. Then the needed substitution array for that block is derived by extracting the key cluster, using that key to recreate an ordered symbol table, and reversing the shuffle transformation. In process step 1066, a check is made to see if additional blocks are present. If yes, the flow returns to process step 1064 to decrypt the next encrypted block. If no, the flow continues to process step 1068 where a checksum of the decrypted data is performed. In process step 1070, the checksum derived in process step 1068 is compared with the checksum 116 (FIG. 1) from the encrypted data. If the checksums do not match, the decryption process aborts in step 1060. If the checksums do match, the plaintext is produced in process step 1072. In embodiments, the plaintext may be saved in a file.

Figure 10:
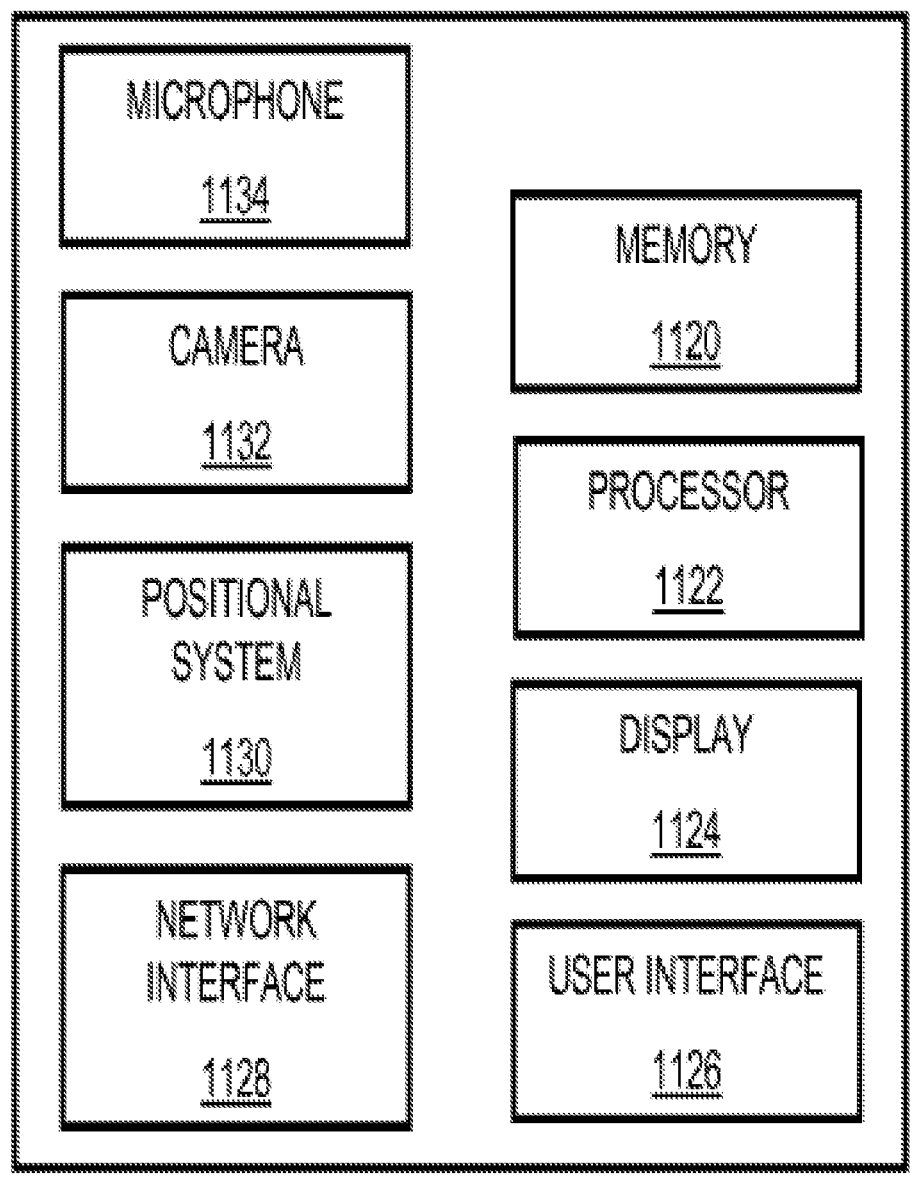
FIG. 10 is a system in accordance with embodiments of the present invention.

FIG. 10 is an exemplary system 1100 in accordance with embodiments of the present invention. System 1100 may be a computer comprising memory 1120, and a processor 1122 which is coupled to (configured to read and write) memory 1120. The memory 1120 is a computer-readable medium, such as flash, ROM, non volatile static ram, or the like. In some embodiments, the memory may be non transitory. The memory 1120 contains instructions (code) that, when executed by processor 1122, performs encryption and/or decryption of data in accordance with embodiments of the present invention. System 1100 may also comprise a display 1124 and a user interface 1126 for interacting with the system 1100. The user interface 1126 may comprise a keyboard, touch screen, mouse, or the like, or any other user interface now known, or developed in the future. System 1100 may be in the form of a computer, such as a desktop or laptop computer, a tablet computer, a mobile device, or any other suitable device. In some embodiments, one or more of the following may also be present: network interface 1128, which may include wired interfaces such as Ethernet and/or wireless interfaces, such as cellular and/or WiFi interfaces; a positional system 1130, such as a Global Positioning System (GPS) receiver or other positional system; a camera 1132, and a microphone 1134. In its basic form, embodiments of the present invention provide a platform independent way to achieve efficient encryption and decryption of data, where the encrypted data is different every time it is generated, even if the plaintext does not change. In some embodiments, various hardware components, such as positional system 1130 may be required to enable the decryption of the data.

Figure 11:
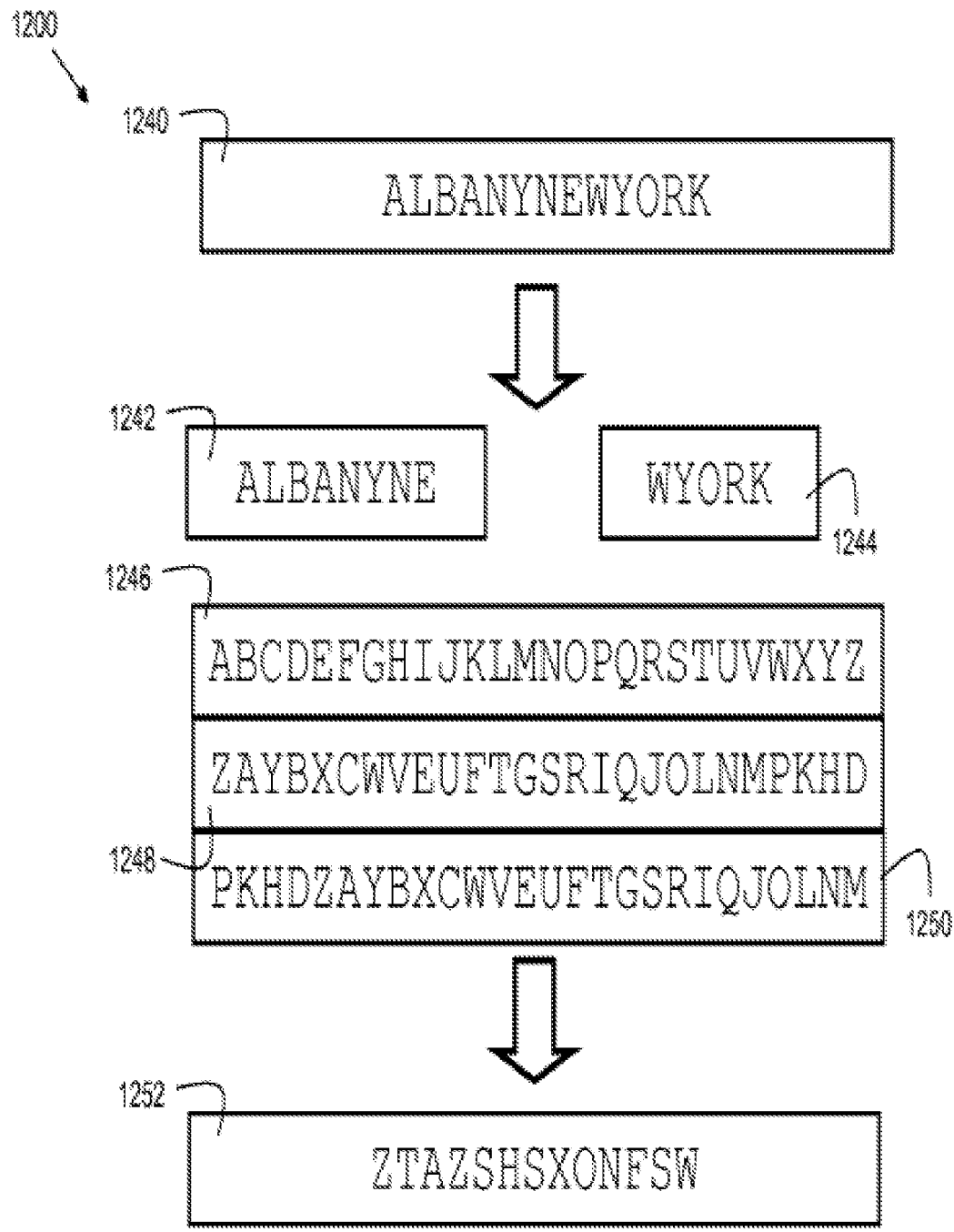
FIG. 11 is an exemplary data flow for encryption of plaintext in accordance with embodiments of the present invention.

FIG. 11 is an exemplary data flow 1200 for encryption of plaintext in accordance with embodiments of the present invention. A plaintext 1240 is processed by breaking the string into portions 1242 and 1244. Then, substitution is performed, replacing characters of the ordered symbol table 1246 with a shuffled array 1248 which serves as a substitution table for text block 1242, and using a different shuffled array 1250 to serve as a substitution table for text block 1244, resulting in encrypted text 1252. For each position of the ordered symbol table, the corresponding character of the shuffled array 1248 is used. Hence, when transcribing the 1242 portion, "Y" in plaintext becomes "H" in encrypted text, and "L" in plaintext becomes "T" in encrypted text. However, when transcribing the 1244 portion, "Y" in plaintext is now represented by "N". Since the shuffled array used to encrypt the block changes with each block, pattern analysis of the encrypted text becomes difficult. The example shown in FIG. 11 is very simple, showing two different shuffled arrays, and is for illustrative purposes only. In practice, the plaintext may be divided into hundreds or thousands of chunks, each chunk having its own shuffled array.

Figure 12:
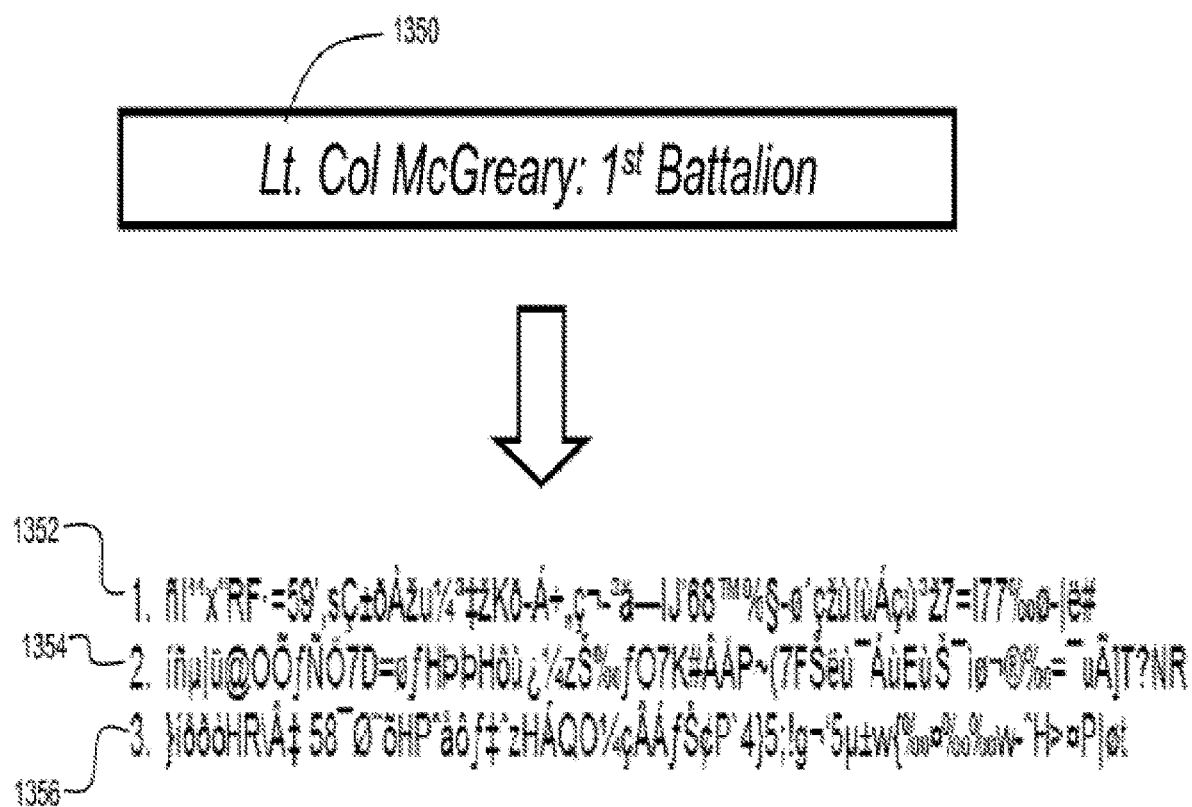
FIG. 12 shows examples of a plaintext and resulting encrypted output from embodiments of the present invention.

FIG. 12 shows examples of a plaintext 1350 and resulting encrypted output from embodiments of the present invention. Three different encrypted outputs are shown (1352, 1354, and 1356). Each encrypted output is drastically different from the other encrypted outputs. Hence, even when encrypting the same plaintext 1350, drastically different encrypted outputs are generated. In this example, the plaintext "Lt. Col McGreary: $1^{st}$ Battalion" is encrypted on three different instances, resulting in the different encrypted outputs 1352, 1354, and 1356. In this embodiment, the ordered symbol table comprises extended ASCII characters, allowing for more substitution possibilities.

Embodiments of the present invention include a computer-implemented method, a system, and a computer program product where one or more programs (executed by at least one processing resource) encrypt data. In some embodiments of the present invention the one or more programs obtain plaintext that includes plaintext data. The one or more programs randomly generate multiple seed keys. The one or more programs obtain a user-defined password. The one or more programs randomly generate encryption parameters, where the parameters include pattern indicators, end pointers, pattern indicator pointers, and component sizes. The one or more programs encrypt the plaintext by converting the plaintext data to shuffle-transform encrypted text and generating, from the shuffle-transform encrypted text and based on the encryption parameters, a plurality of encrypted blocks. The one or more programs implement a dynamic mathematical offset to a portion of mathematical functions underlying the encryption parameters. The one or more programs generate an encrypted chunk for each encrypted block of the plurality of encrypted blocks, wherein the encrypted chunk for each encrypted block contains a portion of the shuffle-transform encrypted text. In some embodiments of the present invention, the an encrypted block of the plurality of encrypted blocks includes a seed key from the multiple seed keys, a pattern indicator from the pattern indicators, a pattern indicator pointer from the indicator pointers, and an end pointer from the end pointers. In some embodiments of the present invention, the end pointer for the encrypted block indicates a location of the pattern indicator pointer for the encrypted block and the pattern indicator pointer indicates a location of the pattern indicator for the encrypted block. In some embodiments of the present invention, the pattern indicator for the encrypted block specifies an encryption pattern for the encrypted block. In some embodiments of the present invention, the pattern indicator and the pattern indicator pointer are dynamically selected for the encrypted block.

In some embodiments of the present invention the one or more programs compute a checksum for the plurality of encrypted blocks. In some embodiments of the present invention, the pattern indicators include a selection of one of many encryption patterns. In some embodiments of the present invention. The indicators include encryption patterns to be used for generating the encrypted chunks.

In some embodiments of the present invention, the one or more programs randomly generating encryption parameters includes generating a key representing a symbol table transformation including symbol table reversal. In some embodiments, randomly generating encryption parameters includes generating a key representing a shuffle transform followed by a key cluster application.

In some embodiments of the present invention, the one or more programs also generate conditional decrypt criteria and insert the conditional decrypt criteria into a preamble, said preamble located in an encrypted block of the plurality of encrypted blocks. When the one or more programs generate the conditional decrypt criteria, this may include generating a condition selected from the group consisting of: a time-before condition, a time-after condition, a GPS in-radius condition, a GPS out-radius condition, a GPS jurisdictional boundary condition, and an entity specific identifier.

In some embodiments of the present invention, the one or more programs generate an encrypted chunk for each encrypted block by selecting a split point of an ordered symbol table, forming a first ordered symbol table portion and a second ordered symbol table portion, reversing the second ordered symbol table portion, and interleaving the first ordered symbol table portion and second ordered symbol table portion to form a shuffled array.

In an embodiment of the present invention, the password is a plurality of characters, and the one or more programs select a split point of the shuffled array based on each character of the password to form a first shuffled array portion and a second shuffled array portion, reverse the second shuffled array portion, and interleave the first ordered symbol table portion and second ordered symbol table portion to form a new shuffled array.

In some embodiments of the present invention, the one or more programs apply a key cluster operation to the shuffled array to form a new shuffled array. This may include identifying a subset of characters in the shuffled array and concatenating the subset of characters to the beginning of the shuffled array to form the new shuffled array.

In some embodiments of the present invention, the plaintext data is comprised of characters and symbols, and the one or more programs perform a frequency analysis on characters comprising the plaintext data to determine most frequently used characters and least frequently used characters in the plaintext data and obfuscate the plaintext data by substituting at least one least frequently used character occurring in the plaintext data for at least one most frequently used character in the plaintext data.

In some embodiments of the present invention, the plaintext data is comprised of characters and symbols, and the one or more programs encrypt by identifying symbols in each encrypted block of the plurality of encrypted blocks that would conflict with execution of program code by the one or more processors and removing the identified symbols.

In some embodiments of the present inventions, the one or more programs implement the dynamic mathematical offset by determining a number of times to offset the portion of mathematical functions underlying the encryption parameters based on the user-defined password. To determine the number of times, the one or more programs, for each character of the user-defined password, generate an integer, order the integers representing each character into an array, and dynamically select one integer of the array, wherein a value of the selected integer comprises the number of times to offset the portion.

In some embodiments of the present invention, the at least one least frequently used character occurring in the plaintext data comprises a string of characters and the at least one most frequently used character in the plaintext data is a single character or In some embodiments of the present invention, a character case of the at least one least frequently used character occurring in the plaintext data matches a character case of the at least one most frequently used character in the plaintext data.

Although the invention has been shown and described with respect to a certain preferred embodiment or embodiments, certain equivalent alterations and modifications will occur to others skilled in the art upon the reading and understanding of this specification and the annexed drawings. In particular regard to the various functions performed by the above described components (assemblies, devices, circuits, etc.) the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more features of the other embodiments as may be desired and advantageous for any given or particular application.

What is claimed is:

1. A computer-implemented method of encrypting data, comprising:
    obtaining, by one or more processors, plaintext comprising plaintext data;
    randomly generating, by the one or more processors, multiple seed keys;
    obtaining, by the one or more processors, a user-defined password;
    randomly generating, by the one or more processors, encryption parameters, wherein the parameters comprise pattern indicators, end pointers, pattern indicator pointers, and component sizes;
    encrypting, by the one or more processors, the plaintext by converting the plaintext data to shuffle-transform encrypted text and generating, from the shuffle-transform encrypted text and based on the encryption parameters, a plurality of encrypted blocks,
        wherein an encrypted block of the plurality of encrypted blocks includes a seed key from the multiple seed keys, a pattern indicator from the pattern indicators, a pattern indicator pointer from the indicator pointers, and an end pointer from the end pointers,
        wherein the end pointer for the encrypted block indicates a location of the pattern indicator pointer for the encrypted block and the pattern indicator pointer indicates a location of the pattern indicator for the encrypted block,
        wherein the pattern indicator for the encrypted block specifies an encryption pattern for the encrypted block, and
        wherein the pattern indicator and the pattern indicator pointer are dynamically selected for the encrypted block,
    implementing, by the one or more processors, a dynamic mathematical offset, to a portion of mathematical functions underlying the encryption parameters; and
    generating, by the one or more processors, an encrypted chunk for each encrypted block of the plurality of encrypted blocks, wherein the encrypted chunk for each encrypted block contains a portion of the shuffle-transform encrypted text.

2. The method of claim 1, further comprising computing a checksum for the plurality of encrypted blocks.

3. The method of claim 1, wherein the pattern indicators comprise a selection of one of many encryption patterns.

4. The method of claim 3, wherein indicators comprise encryption patterns to be used for generating the encrypted chunks.

5. The method of claim 4, wherein the randomly generating encryption parameters includes generating a key representing a symbol table transformation including symbol table reversal.

6. The method of claim 1, wherein the randomly generating encryption parameters includes generating a key representing a shuffle transform followed by a key cluster application.

7. The method of claim 1, further comprising:
    generating conditional decrypt criteria; and
    inserting the conditional decrypt criteria into a preamble, said preamble located in an encrypted block of the plurality of encrypted blocks.

8. The method of claim 7, wherein generating conditional decrypt criteria includes generating a condition selected from the group consisting of: a time-before condition, a time-after condition, a GPS in-radius condition, a GPS out-radius condition, a GPS jurisdictional boundary condition, and an entity specific identifier.

9. The method of claim 1, wherein the generating an encrypted chunk for each encrypted block comprises:
 selecting, by the one or more processors, a split point of an ordered symbol table, forming a first ordered symbol table portion and a second ordered symbol table portion;
 reversing, by the one or more processors, the second ordered symbol table portion; and
 interleaving, by the one or more processors, the first ordered symbol table portion and second ordered symbol table portion to form a shuffled array.

10. The method of claim 9, wherein the password comprises a plurality of characters, and the method further comprising:
 selecting, by the one or more processors, a split point of the shuffled array based on each character of the password to form a first shuffled array portion and a second shuffled array portion;
 reversing, by the one or more processors, the second shuffled array portion; and
 interleaving, by the one or more processors, the first ordered symbol table portion and second ordered symbol table portion to form a new shuffled array.

11. The method of claim 9, further comprising applying a key cluster operation to the shuffled array to form a new shuffled array.

12. The method of claim 11, wherein applying a key cluster operation comprises identifying a subset of characters in the shuffled array and concatenating the subset of characters to the beginning of the shuffled array to form the new shuffled array.

13. The method of claim 1, wherein the plaintext data is comprised of characters and symbols, the encrypting further comprising:
 performing, by the one or more processors, a frequency analysis on characters comprising the plaintext data to determine most frequently used characters and least frequently used characters in the plaintext data; and
 obfuscating, by the one or more processors, the plaintext data by substituting at least one least frequently used character occurring in the plaintext data for at least one most frequently used character in the plaintext data.

14. The method of claim 13, wherein the at least one least frequently used character occurring in the plaintext data comprises a string of characters and the at least one most frequently used character in the plaintext data is a single character.

15. The method of claim 14, wherein a character case of the at least one least frequently used character occurring in the plaintext data matches a character case of the at least one most frequently used character in the plaintext data.

16. The method of claim 1, wherein the plaintext data is comprised of characters and symbols, the encrypting further comprising:
 identifying, by the one or more processors, symbols in each encrypted block of the plurality of encrypted blocks that would conflict with execution of program code by the one or more processors; and
 removing, by the one or more processors, the identified symbols.

17. The method of claim 1, wherein the implementing the dynamic mathematical offset comprises determining a number to add to a portion of mathematical functions underlying the encryption parameters based on the user-defined password.

18. The method of claim 17, wherein the determining comprises:
 for each character of the user-defined password, generating, by the one or more processors, an integer;
 ordering the integers representing each character into an array; and
 dynamically selecting one integer of the array, wherein a value of the selected integer comprises the number to add to an offset for the portion.

19. A computer program product, the computer program product comprising:
 a non-transitory computer-readable storage medium readable by a processing circuit and storing instructions for execution by the processing circuit, the execution causing one or more processors to perform a method comprising:
  obtaining, by the one or more processors, plaintext comprising plaintext data;
  randomly generating, by the one or more processors, multiple seed keys;
  obtaining, by the one or more processors, a user-defined password;
  randomly generating, by the one or more processors, encryption parameters, wherein the parameters comprise pattern indicators, end pointers, pattern indicator pointers, and component sizes;
  encrypting, by the one or more processors, the plaintext by converting the plaintext data to shuffle-transform encrypted text and generating, from the shuffle-transform encrypted text and based on the encryption parameters, a plurality of encrypted blocks,
   wherein an encrypted block of the plurality of encrypted blocks includes a seed key from the multiple seed keys, a pattern indicator from the pattern indicators, a pattern indicator pointer from the indicator pointers, and an end pointer from the end pointers,
   wherein the end pointer for the encrypted block indicates a location of the pattern indicator pointer for the encrypted block and the pattern indicator pointer indicates a location of the pattern indicator for the encrypted block,
   wherein the pattern indicator for the encrypted block specifies an encryption pattern for the encrypted block, and
   wherein the pattern indicator and the pattern indicator pointer are dynamically selected for the encrypted block;
  implementing, by the one or more processors, a dynamic mathematical offset, to a portion of mathematical functions underlying the encryption parameters; and
  generating, by the one or more processors, an encrypted chunk for each encrypted block of the plurality of encrypted blocks, wherein the encrypted chunk for each encrypted block contains a portion of the shuffle-transform encrypted text.

20. A computer system for implementation of a data encryption, the computer system comprising:
 a memory; and
 one or more processors in communications with the memory, wherein the computer system is configured to perform a method, said method comprising:

obtaining, by the one or more processors, plaintext comprising plaintext data;

randomly generating, by the one or more processors, multiple seed keys;

obtaining, by the one or more processors, a user-defined password;

randomly generating, by the one or more processors, encryption parameters, wherein the parameters comprise pattern indicators, end pointers, pattern indicator pointers, and component sizes;

encrypting, by the one or more processors, the plaintext by converting the plaintext data to shuffle-transform encrypted text and generating, from the shuffle-transform encrypted text and based on the encryption parameters, a plurality of encrypted blocks, wherein an encrypted block of the plurality of encrypted blocks includes a seed key from the multiple seed keys, a pattern indicator from the pattern indicators, a pattern indicator pointer from the indicator pointers, and an end pointer from the end pointers, wherein the end pointer for the encrypted block indicates a location of the pattern indicator pointer for the encrypted block and the pattern indicator pointer indicates a location of the pattern indicator for the encrypted block, wherein the pattern indicator for the encrypted block specifies an encryption pattern for the encrypted block, and wherein the pattern indicator and the pattern indicator pointer are dynamically selected for the encrypted block;

implementing, by the one or more processors, a dynamic mathematical offset, to a portion of mathematical functions underlying the encryption parameters; and generating, by the one or more processors, an encrypted chunk for each encrypted block of the plurality of encrypted blocks, wherein the encrypted chunk for each encrypted block contains a portion of the shuffle-transform encrypted text.

\* \* \* \* \*